United States Patent [19]
Forte

[11] Patent Number: 5,408,815
[45] Date of Patent: Apr. 25, 1995

[54] ROTARY MOWER SHREDDER ATTACHMENT

[76] Inventor: Victor G. Forte, P.O. Box 143, Hudson, Colo. 80642

[21] Appl. No.: 102,354

[22] Filed: Aug. 5, 1993

[51] Int. Cl.$^6$ .................. A01D 34/68; B02C 18/10
[52] U.S. Cl. .................... 56/17.5; 56/320.2; 56/DIG. 9; 241/101.1
[58] Field of Search .............. 56/17.5, 320.1, 16.9, 56/320.2, 500, 503, DIG. 2, DIG. 9; 241/101.1, 101.7, 46.015, 46.016, 46.014

[56] References Cited

U.S. PATENT DOCUMENTS

| | | | |
|---|---|---|---|
| 3,524,596 | 8/1970 | Smith | 241/46.016 |
| 3,808,782 | 5/1974 | McWilliams | 56/16.9 |
| 4,083,166 | 4/1978 | Haas | 56/13.7 |
| 4,089,474 | 5/1978 | Timmer | 241/46.016 |
| 4,253,616 | 3/1981 | Timmer | 241/46.016 |
| 5,231,827 | 8/1993 | Connolly et al. | 56/320.2 X |
| 5,305,587 | 4/1994 | Johnson | 241/101.7 X |

Primary Examiner—Terry Lee Melius

[57] ABSTRACT

A method and apparatus for converting a conventional rotary mower to a shredder which includes cutting an aperture or hole in a deck of the mower above the cutting blades thereof, positioning and affixing to the deck a feeding assembly above the hole; and interposing between the hole and the feeding assembly a plurality of triangular resilient fingers depressible to permit feeding of an object to be shredded therethrough and elastically returnable to prevent debris from being thrown back up through the hole by action of the cutting blade of the mower.

4 Claims, 4 Drawing Sheets

ROTARY MOWER SHREDDER ATTACHMENT

BACKGROUND OF THE INVENTION

1. Field of the Invention

The present invention relates to rotary lawn mowers and more particularly pertains to a method and apparatus which may be utilized to convert such mower into a shredder.

2. Description of the Prior Art

The use of shredder attachments for mowers is known in the prior art. More specifically, such attachments heretofore devised and utilized for the purpose of converting a mower to a shredder are known to consist basically of familiar, expected and obvious structural configurations, notwithstanding the myriad of designs encompassed by the crowded prior art which have been developed for the fulfillment of countless objectives and requirements. A simple conversion unit capable of being added to an existing mower without major alterations or installations difficulties is needed in the art. Examples of other attachments are shown in U.S. Pat. Nos. 4,938,011; 4,283,018; 3,908,914; 4,796,416; and 3,963,184.

In this respect, the rotary mower attachment according to the present invention substantially departs from the conventional concepts and designs of the prior art, and in so doing provides method and apparatus primarily developed for the purpose of easy conversion of a conventional rotary mower into a shredder.

Therefore, it can be appreciated that there exists a continuing need for new and improved shredder attachments which can enable easy conversion of a conventional rotary mower into a shredder. In this regard, the present invention substantially fulfills this need.

SUMMARY OF THE INVENTION

In view of the foregoing disadvantages inherent in the known types of shredder attachments now present in the prior art, the present invention provides an improved attachment construction wherein the same can be utilized by the average homeowner to convert a rotary power mower into a shredder. As such, the general purpose of the present invention, which will be described subsequently in greater detail, is to provide a new and improved rotary mower shredder attachment and method which has all the advantages of the prior art devices and none of the disadvantages.

To attain this, the present invention essentially relates to a method and apparatus for converting a conventional rotary mower to a shredder which comprises: cutting an aperture or hole in the deck of said conventional mower above the cutting blades thereof; positioning and affixing to said deck a feeding means above said hole and interposing between said hole and said feeding means a plurality of triangular resilient fingers depressible to permit feeding an object to be shredded therethrough and elastically returnable to prevent debris from being thrown back up through said hole by action of the cutting blades.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rotary mower shredder attachment which has all the advantages of the prior art devices and none of the disadvantages.

It is another object of the present invention to provide a new and improved rotary mower shredder attachment which may be easily and efficiently manufactured and marketed.

It is a further object of the present invention to provide a new and improved rotary mower shredder attachment which is of a durable and reliable construction.

An even further object of the present invention is to provide a new and improved rotary mower shredder attachment which is susceptible of a low cost of manufacture with regard to both materials and labor, and which accordingly is then susceptible of low prices of sale to the consuming public, thereby making such attachments economically available to the buying public.

Still yet another object of the present invention is to provide a new and improved rotary mower shredder attachment which provides in the apparatuses and methods of the prior art some of the advantages thereof, while simultaneously overcoming some of the disadvantages normally associated therewith.

Still another object of the present invention is to provide a new and improved rotary mower shredder attachment which can easily be installed on an existing rotary mower.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein.

DESCRIPTION OF THE PREFERRED EMBODIMENT

Figure 1:
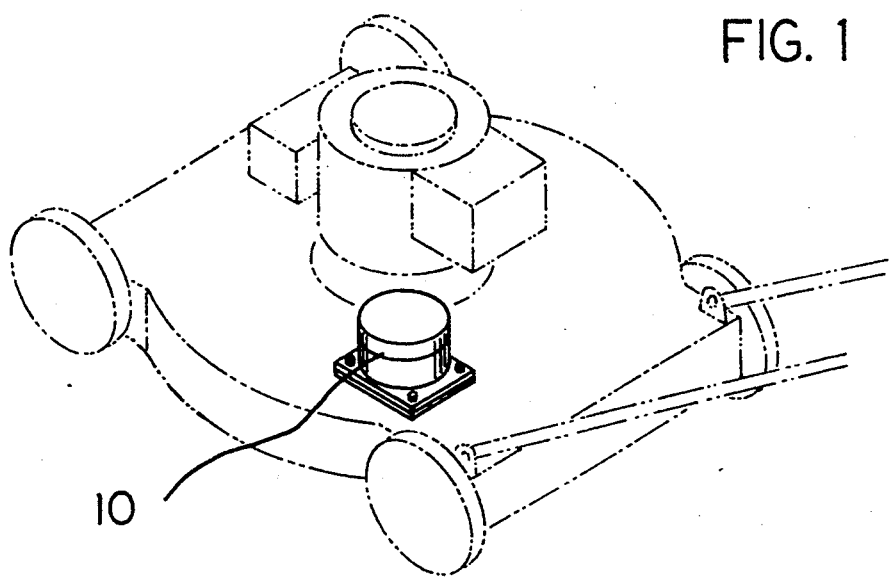
FIG. 1 is a perspective view showing the device of the present invention mounted on a conventional rotary mower.

With reference now to the drawings, and in particular to FIG. 1 thereof, a new and improved rotary mower shredder attachment embodying the principles and concepts of the present invention and generally designated by the reference numeral 10 will be described.

As will be seen from FIG. 1, the attachment 10 of the present invention is simply installed on the deck of a rotary mower (shown in broken lines).

Figure 2:
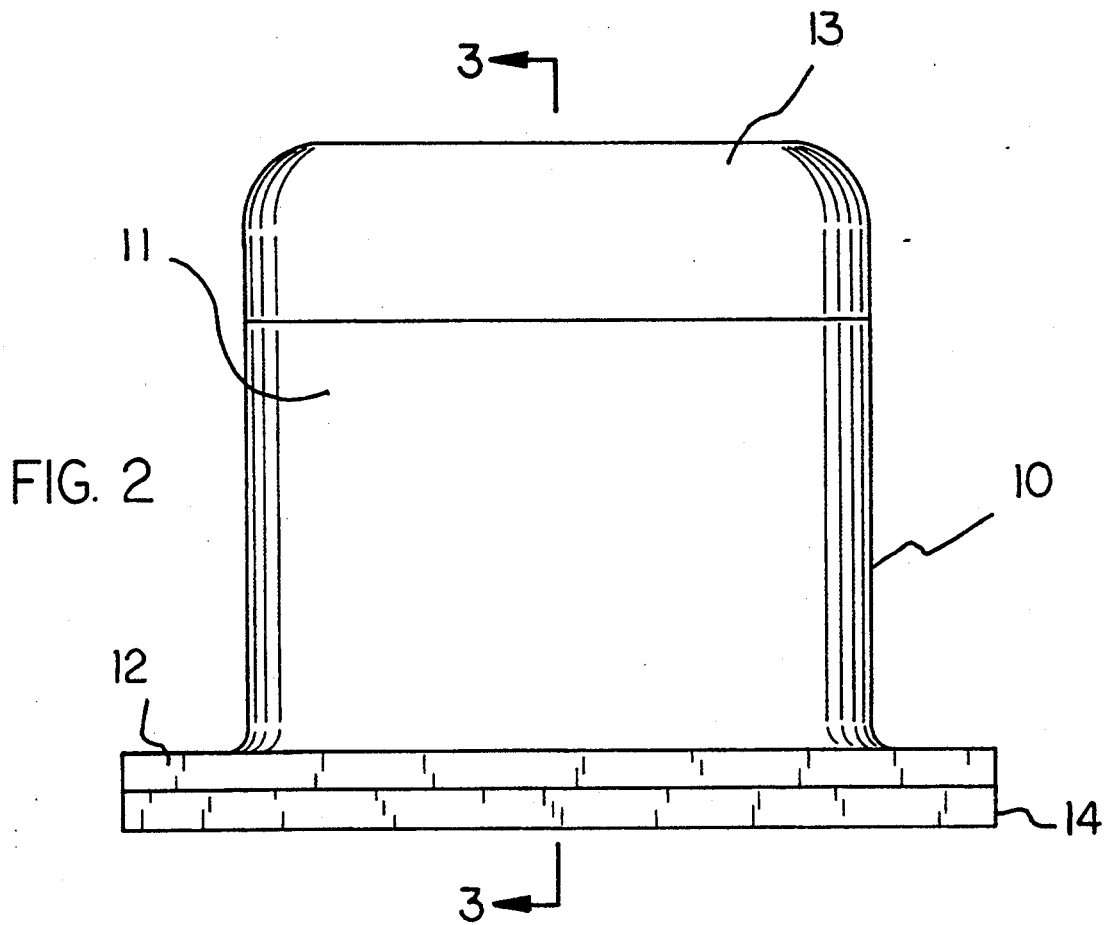
FIG. 2 is a front plan view of the device of the present invention.

FIG. 2 illustrates the attachment 10 as it would be supplied to a purchaser for use. The attachment 10 has a feeder chute 11 (preferably cylindrical in shape) affixed to a rigid flange member 12. A removable cover member 13 is provided for feeder chute 11. Affixed to the underside of flange member 12 is a thick elastomeric gasket member 14. Preferably the gasket member 14 is adhesively secured to flange member 12.

Figure 3:
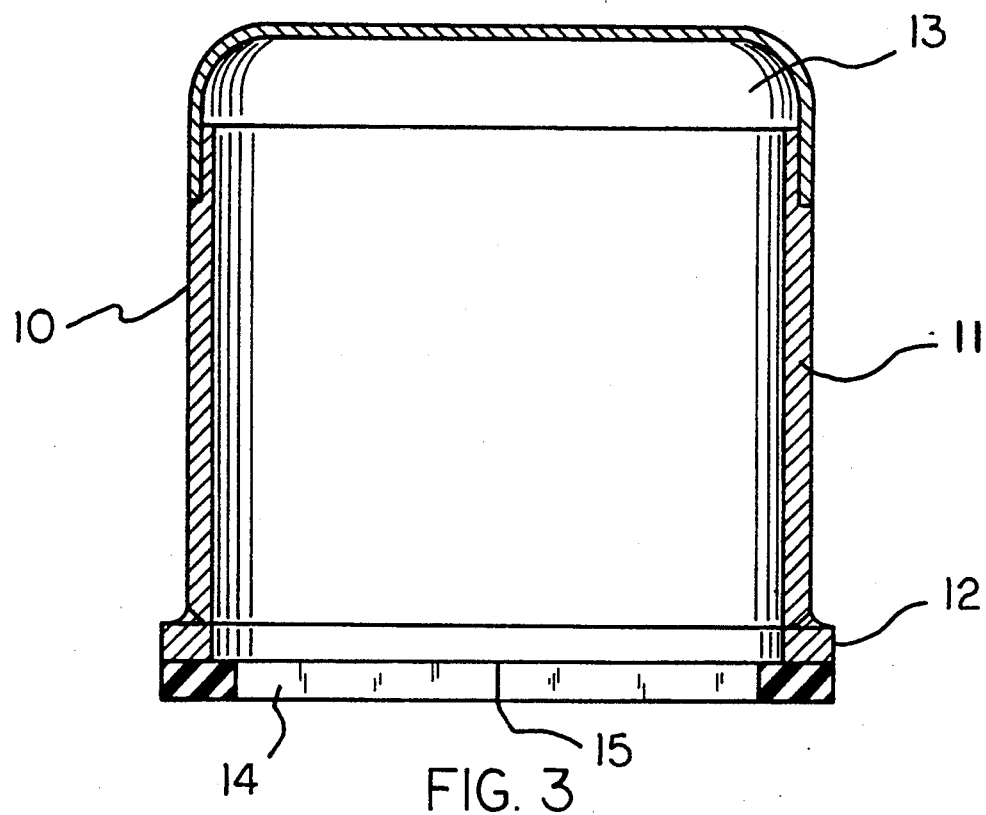
FIG. 3 is a sectional view on line 3—3 of FIG. 2.

FIG. 3 illustrates in more detail the components of FIG. 2 and shows that gasket member 14 has a split 15 in the center thereof.

Figure 4:
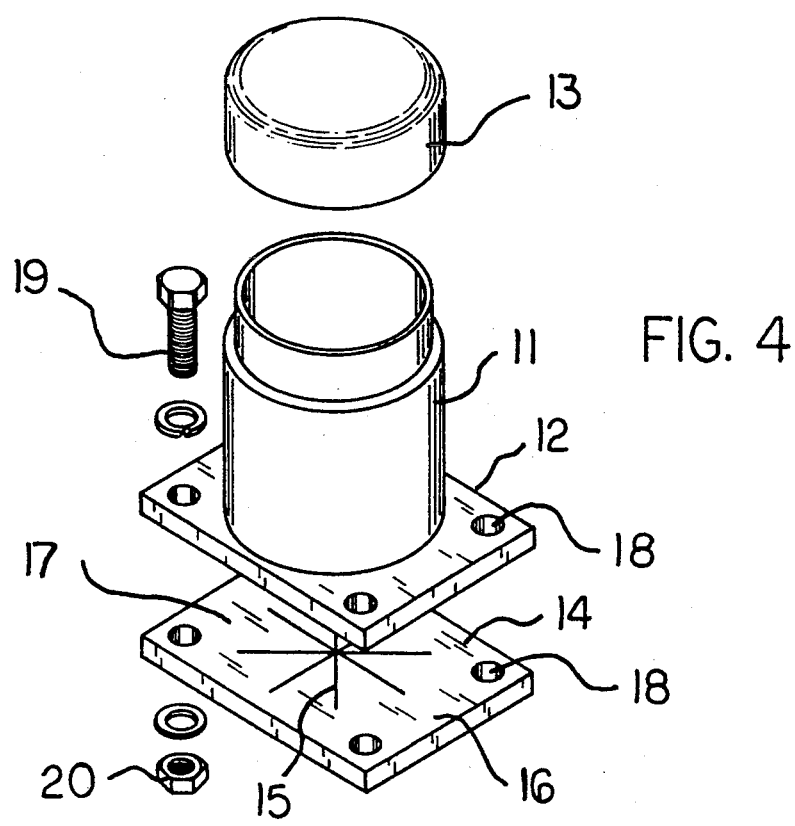
FIG. 4 is an exploded perspective view showing the components of the device of the present invention.

FIG. 4 shows the assembly of unit 10 with the parts stacked in an exploded view. Again, in this view, the gasket member 14 is more clearly shown. It will be noted that gasket member 14 has a plurality of slits 15 radiating out from the center of such gasket member 14 and extending through the solid continuous face 16 thereof to form a plurality of triangular fingers 17. These fingers 17, being formed of thick elastomeric material, will depress when an item to be shredded, e.g. a stick, is pushed down the open chute member 11 superposed on gasket member 14 to allow such item to pass down through the mower deck and into contact with the cutting blade below said deck. Because of the nature of the elastomeric material and the shape of fingers 17, the items will be securely held by such fingers 17 as it is fed therethrough. This eliminates throwback of such item by the action of the cutting blade while such item is being shredded. Likewise, upon the item passing completely through gasket member 14, the resilient fingers 17 will snap back into place providing a barrier to debris being thrown back up into feeder chute member 11. Cover member 13 is a further safeguard against this and against items being accidentally dropped into feeder chute 11. Holes 18 are provided in flange member 12 and gasket member 14 to permit bolts 19 to be dropped therethrough and through corresponding holes drilled in the mower cover to permit anchoring the unit 10 to such mower cover with nuts 20 threading tightly to bolts 19 after insertion through such holes.

Figure 5:
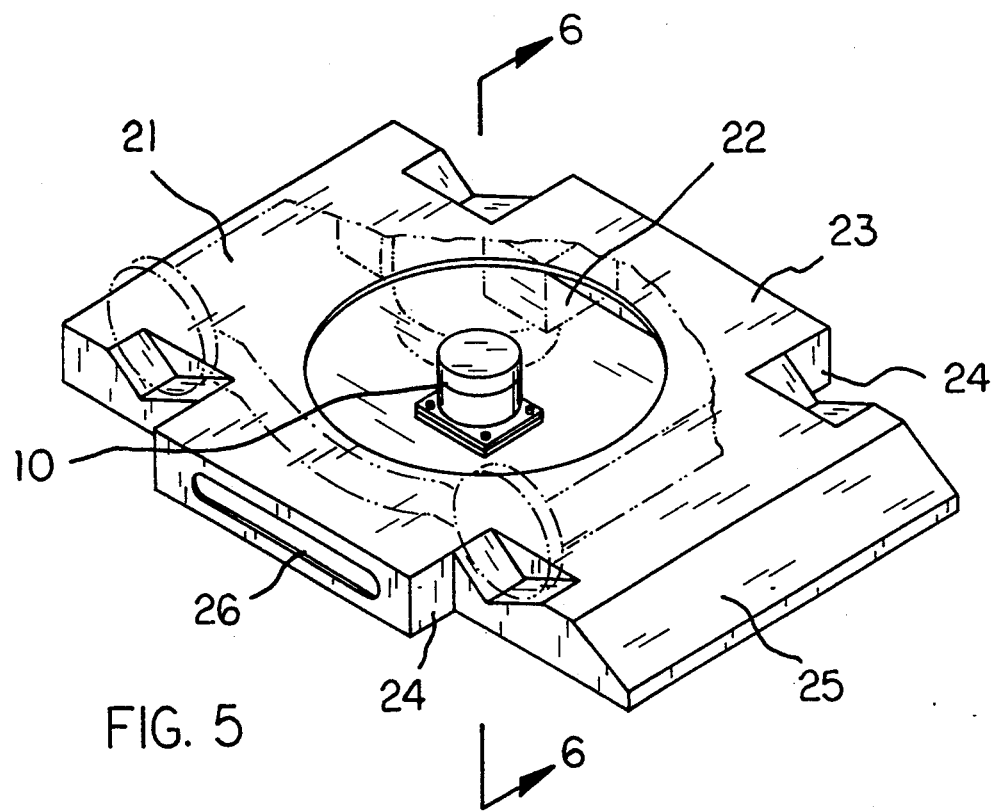
FIG. 5 is an additional modification of the present invention shown in a top perspective view.
Figure 6:
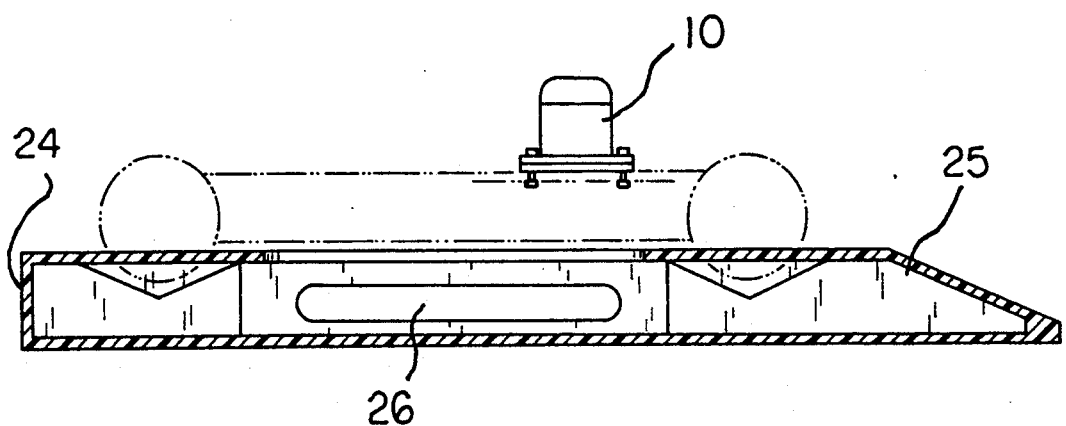
FIG. 6 is a sectional view on line 6—6 of FIG. 5.

FIGS. 5 through 8 illustrate the conversion of a mower having the attachment 10 of the present invention to a stationary shredder. As shown in FIG. 5, the mower deck (shown in broken lines) is positionable on top of a hood member enclosure 21 which has a cut out center portion 22 permitting entrance of shredded debris into the hood member enclosure. The hood member enclosure 21 has a flat deck portion 23 which is positionable underneath the deck portion of the mower, as illustrated in FIG. 6, a plurality of downwardly projecting side members 24, and an unlabeled bottom wall member which cooperate to define the substantially hollow hood member enclosure 21. A projecting ramp member 25 extends from a forward end of the hood member enclosure 21 to facilitate a rolling placement of the mower thereonto. At least one of the side members 24 includes a discharge opening 26 permitting egress of the shredded debris from within the hood member enclosure 21. By this structure, shredded debris and the like are directed into the hood member enclosure 21 during use of the mower as a shredder to at least partially contain such debris.

Figure 7:
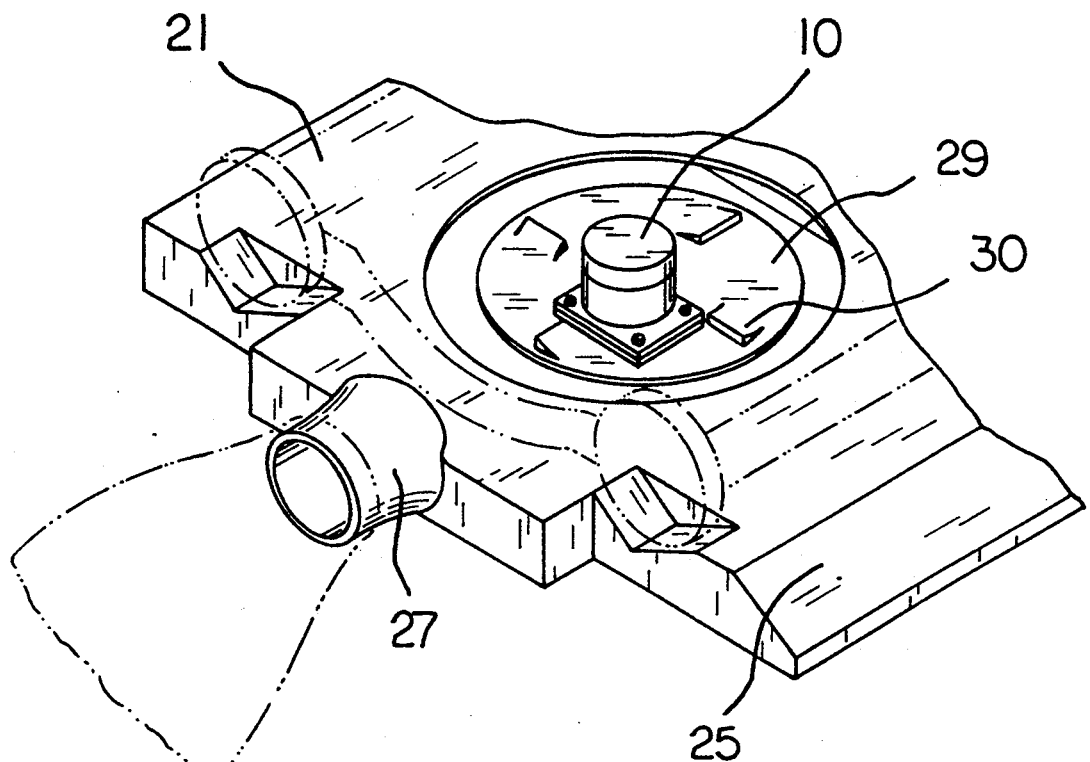
FIG. 7 is illustrates in a top perspective view a still further modification of the unit shown in FIG. 5.
Figure 8:
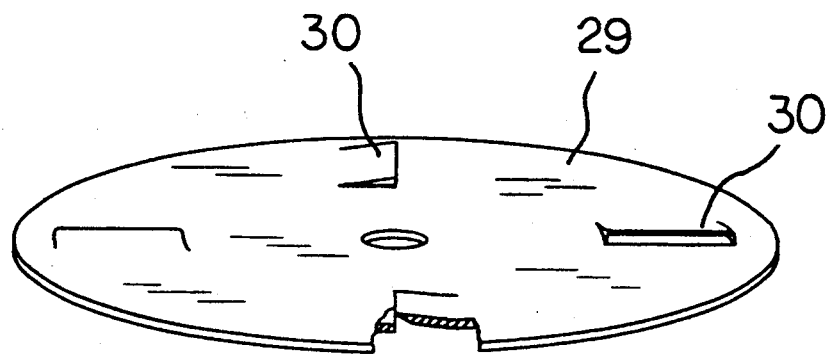
FIG. 8 is a top perspective view of a special cutting blade shown in FIG. 7.

A sectional view of hood 21 is shown in FIG. 6 with the discharge opening from the shredding area under the mower being shown at 26. FIG. 7 illustrates the modification of such discharge opening 26 to provide a bag engaging member 27 to permit collecting of mulch from the shredder. When being utilized, as in these Figures, as a stationary shredder, the regular blade 28 as shown in detail in FIG. 8. Such blade 28 consists of a disc member 29 having a plurality of raised, sharp edged cutters 30 extending up from the plane of disc 29. This type of blade will be less prone to jamming than a conventional cutter blade and can easily be substituted for such blade on a conventional rotary mower.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotary mower shredder attachment kit comprising:
   feeder means for receiving and directing therethrough material to be shredded;
   anchoring means for anchoring said feeder means to a deck of a conventional rotary mower above and surrounding a hole cut in said deck;
   an elastomeric gasket interposed between said feeder means and said deck of said rotary mower, said gasket being planar in shape and having a plurality of radial slots extending through a center portion thereof which cooperate to define a plurality of resiliently deformable elastomeric triangular fingers positioned between said feeder means and the deck of said mower so as to extend over said hole in said deck; and,
   a hood member enclosure for receiving thereon said mower, said hood member enclosure having a flat deck portion positionable underneath said deck of said mower, a plurality of downwardly projecting side members extending from said flat deck portion, and a bottom wall member extending between said side members which cooperate to define a substantially hollow shape of said hood member enclosure, said hood member enclosure being shaped so as to define a cut out center portion extending through said flat deck portion permitting entrance of shredded debris directed from said mower into said hood member enclosure; and at least one of the side members including a discharge opening permitting egress of shredded debris from within said hood member enclosure.

2. The rotary mower shredder attachment kit of claim 1, wherein said hood member enclosure is shaped so as to define a projecting ramp member extending from a forward end thereof to facilitate a rolling placement of said mower thereonto.

3. The rotary mower shredder attachment kit of claim 2, and further comprising a bag engaging member coupled to said hood member enclosure over said discharge opening for coupling a flexible bag into communication with an interior of said hood member enclosure, whereby shredded debris can be directed into a flexible bag.

4. The rotary mower shredder attachment kit of claim 1, and further comprising a bag engaging member coupled to said hood member enclosure over said discharge opening for coupling a flexible bag into communication with an interior of said hood member enclosure, whereby shredded debris can be directed into a flexible bag.

* * * * *